US010777226B2

United States Patent
Amacker et al.

(10) Patent No.: US 10,777,226 B2
(45) Date of Patent: Sep. 15, 2020

(54) SELECTIVE SHARING OF BODY DATA

(71) Applicant: A9.com, Inc., Palo Alto, CA (US)

(72) Inventors: Matthew Warren Amacker, Santa Clara, CA (US); Joel D. Tesler, Cupertino, CA (US)

(73) Assignee: A9.COM, INC., Palo Alto, CA (US)

( * ) Notice: Subject to any disclaimer, the term of this patent is extended or adjusted under 35 U.S.C. 154(b) by 92 days.

(21) Appl. No.: 14/742,541

(22) Filed: Jun. 17, 2015

(65) Prior Publication Data

US 2015/0286829 A1    Oct. 8, 2015

Related U.S. Application Data

(63) Continuation of application No. 13/524,700, filed on Jun. 15, 2012, now Pat. No. 9,263,084.

(51) Int. Cl.
*H04N 7/16* (2011.01)
*G06F 7/04* (2006.01)
(Continued)

(52) U.S. Cl.
CPC ........ *G11B 20/00086* (2013.01); *G06F 3/017* (2013.01); *G06F 3/0304* (2013.01);
(Continued)

(58) Field of Classification Search
CPC ...... G06F 3/017; G06F 3/0304; G06F 21/604; G06T 13/40; G06T 19/00; G06T 2210/16;
(Continued)

(56) References Cited

U.S. PATENT DOCUMENTS 5,651,067 A * 7/1997 Ahrens ................ G06Q 20/341
380/277
5,909,218 A * 6/1999 Naka ....................... G06T 13/40
345/418

(Continued)

OTHER PUBLICATIONS

Toshiyuki Kirishima, Real-Time Gesture Recognition by Learning and Selective Control of Visual Interest Points; IEEE; vol. 27, No. 3, Mar. 2005; p. 351-364.*

(Continued)

*Primary Examiner* — Monjur Rahim
(74) *Attorney, Agent, or Firm* — Hogan Lovells US LLP

(57) ABSTRACT

Information from a position and/or gesture detection system can be transmitted to various devices in order to enable users to interact and/or view others users. In some embodiments, video is captured that includes a current view of the body of a user. In order to prevent an unauthorized, unintended, or undesired transmission of at least part of the body image data, one or more settings or policies can be specified that can control which portions are transmitted, received, and/or displayed. For example, a user can be prompted before body image or position data is transmitted, which enables a user to control the type of data that is sent. A recipient or intermediate entity or component can also specify one or more settings or policies to control the type of data that is transmitted and/or received. In some embodiments, an external service can be utilized to manage the transmission of data.

18 Claims, 8 Drawing Sheets

(51) Int. Cl.
| | |
|---|---|
| *G11B 20/00* | (2006.01) |
| *G06F 21/60* | (2013.01) |
| *G06F 3/01* | (2006.01) |
| *G06T 19/00* | (2011.01) |
| *G06Q 30/06* | (2012.01) |
| *H04N 21/442* | (2011.01) |
| *G06F 3/03* | (2006.01) |
| *G06T 13/40* | (2011.01) |

(52) U.S. Cl.
CPC ....... *G06F 21/604* (2013.01); *G06Q 30/0601* (2013.01); *G06T 13/40* (2013.01); *G06T 19/00* (2013.01); *H04N 21/44218* (2013.01); *G06T 2210/16* (2013.01)

(58) Field of Classification Search
CPC ....... H04N 21/44218; G11B 20/00086; G06Q 30/0601
USPC .......................................................... 726/27
See application file for complete search history.

(56) References Cited

U.S. PATENT DOCUMENTS

| | | | | |
|---|---|---|---|---|
| 6,256,400 | B1* | 7/2001 | Takata | G06K 9/00335 379/52 |
| 6,775,671 | B1* | 8/2004 | de Lara | G06F 17/30905 |
| 7,529,940 | B1* | 5/2009 | Winkel | H04L 51/063 709/206 |
| 7,971,156 | B2 | 6/2011 | Albertson et al. | |
| 8,825,611 | B1* | 9/2014 | Jorgensen | G06F 21/6218 707/694 |
| 9,245,177 | B2* | 1/2016 | Perez | G06K 9/00355 |
| 2002/0087686 | A1* | 7/2002 | Cronk | G06F 17/30899 709/225 |
| 2002/0135483 | A1* | 9/2002 | Merheim | G06K 9/00771 340/573.1 |
| 2005/0213790 | A1 | 9/2005 | Rhoads et al. | |
| 2005/0257066 | A1* | 11/2005 | John | G06F 21/6227 713/182 |
| 2005/0278738 | A1* | 12/2005 | Kaneko | G06F 3/04842 725/40 |
| 2008/0037626 | A1 | 2/2008 | Kokubo et al. | |
| 2008/0170776 | A1 | 7/2008 | Albertson et al. | |
| 2008/0189625 | A1* | 8/2008 | Zuta | H04N 1/32128 715/753 |
| 2008/0306951 | A1 | 12/2008 | Rodefer | |
| 2011/0093820 | A1* | 4/2011 | Zhang | A63F 13/06 715/863 |
| 2011/0169927 | A1 | 7/2011 | Mages et al. | |
| 2011/0298827 | A1* | 12/2011 | Perez | G06K 9/00355 345/647 |
| 2011/0298897 | A1 | 12/2011 | Sareen et al. | |
| 2011/0302293 | A1* | 12/2011 | Buban | G06F 3/011 709/224 |
| 2012/0086783 | A1 | 4/2012 | Sareen | |
| 2012/0092328 | A1* | 4/2012 | Flaks | G02B 27/017 345/419 |
| 2012/0166974 | A1 | 6/2012 | Elford et al. | |
| 2012/0167235 | A1 | 6/2012 | Donfried | |
| 2012/0173963 | A1 | 7/2012 | Hoke et al. | |
| 2012/0221418 | A1 | 8/2012 | Smith | |
| 2012/0239513 | A1 | 9/2012 | Oliver et al. | |
| 2012/0290433 | A1 | 11/2012 | England et al. | |
| 2012/0297190 | A1 | 11/2012 | Shen et al. | |
| 2013/0047123 | A1 | 2/2013 | May et al. | |
| 2013/0143651 | A1 | 6/2013 | Harrison et al. | |

OTHER PUBLICATIONS

USPTO Non Final Office Action dated Jun. 6, 2014 for U.S. Appl. No. 13/524,700, filed Jun. 15, 2012 (14 pages).
USPTO Final Office Action dated Dec. 17, 2014 for U.S. Appl. No. 13/524,700, filed Jun. 15, 2012 (10 pages).
USPTO Notice of Allowance dated Mar. 11, 2015 for U.S. Appl. No. 13/524,700, filed Jun. 15, 2012 (11 pages).
Rougeul-Buser; A Topographical Analysis of Localized "Synchronized" Activities on the Cortex of Normal Cat and Monkey; Year 1975; Acta; p. 805-819.

* cited by examiner

SELECTIVE SHARING OF BODY DATA

RELATED APPLICATIONS

This application is a continuation of allowed U.S. application Ser. No. 13/524,700, entitled "SELECTIVE SHARING OF BODY DATA" filed Jun. 15, 2012; of which the full disclosure of this application is incorporated herein by reference for all purposes.

BACKGROUND

People are increasingly utilizing computing and electronic devices to perform various types of tasks. In order to enable users to efficiently perform these tasks, various methods of interacting with the devices are being provided. For example, certain devices enable a user to use basic gestures to provide input to a device. Components such as a camera and infrared sensors can detect the movement of a user for purposes of providing input to these devices. In certain environments, it might be desirable to transmit at least some of this data to another device, in order to enable one or more other devices to utilize the image or gesture data for various purposes. Such use comes with various privacy concerns, however, as users will want to be able to prevent the transmission of image data to various sources, as well as to prevent the receiving of such data from various sources. Other entities may also want to be able to control at least some aspects of the transmission of such data, in order to avoid liability for the transmission, possession, and/or use of such data.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to transmitting data between electronic devices. In particular, various approaches discussed herein enable an entity such as a user, developer, or service provider to control or manage the transmission of certain types of body-related data for various purposes. For example, a computing device might include, or be in communication with, a device that is able to capture body image data for a user, which can be analyzed to determine the positions of various features of the user, as well as to determine various motions or gestures being performed by that user. In at least some situations, an application, site, or other such component might want access to this data, such as to display the body data to another user, enable control of an application through the use of motions determined from the data, etc. In order to prevent the sending of body image data to an unauthorized or undesired entity, various controls or permissions can be set or provided that enable a user, developer, manufacturer, or other such entity to control the type of body data that can be sent, the type of recipient to receive body data, the type of body data that can be received, and other such aspects. In some embodiments, no body image data might be allowed to be transmitted when the user is a minor, or no body image data might be allowed to be received and/or displayed when more than a certain amount of skin is determined to be showing. In some embodiments, body image data might be able to be transmitted to family members or social connections, but only body position data might be able to be sent to other entities. Certain service providers or manufacturers also can be provided with the ability to control, manage, or restrict the types of body data that can be sent for various purposes.

Various other applications, processes, and uses are presented below with respect to the various embodiments.

Figure 1:
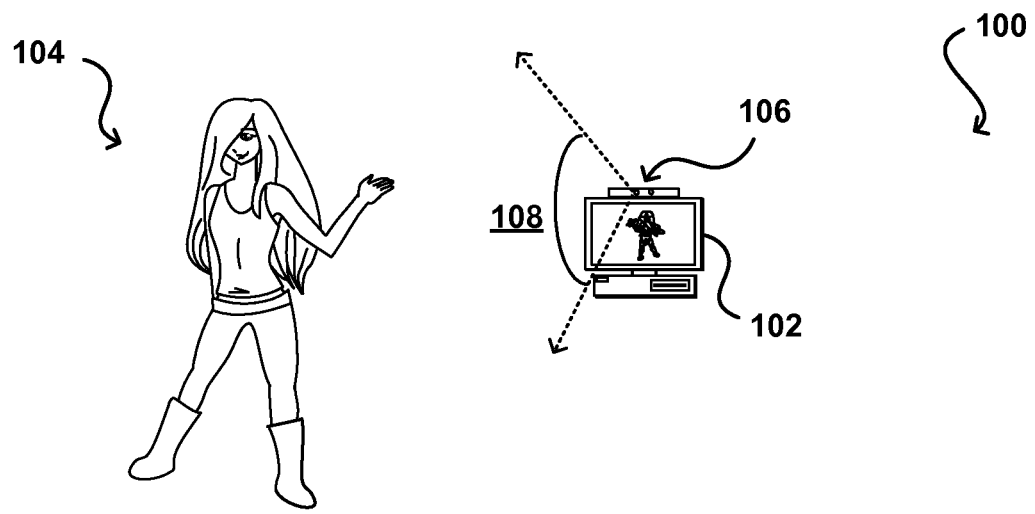
FIG. 1 illustrates an example of a user interacting with a computing device in accordance with at least one embodiment.

FIG. 1 illustrates an example situation 100 wherein a user 104 is interacting with a computing device 102. Although a desktop computing device is shown in this example, it should be understood that various other types of electronic device that are capable of determining and processing input can be used in accordance with various embodiments discussed herein. These devices can include, for example, smart phones, e-book readers, tablet computers, notebook computers, personal data assistants, video gaming consoles or controllers, smart televisions, and portable media players, among others. Further, the components illustrated can be part of a single device, while at least some components illustrated and otherwise utilized for such a device can be provided as one or more peripheral devices or accessories within the scope of the various embodiments.

In the example of FIG. 1, the computing device 102 has one or more imaging elements 106 positioned so as to be able to capture images (or video) of at least a portion of a user positioned in a conventional location with respect to the device. In this example where the computing device has a primary display screen, the imaging elements can be positioned so as to capture images of a user positioned substantially in front of the display screen, where the user would typically be positioned to interact with the device. The imaging elements can include at least one camera or sensor with a lens having an angular field of view 108 such that image information can be captured of a user as long as at least a portion of that user 104 is at least partially within that field of view 108. In order to detect certain motions, positions, or gestures, however, at least a minimum portion of one or more specific features of the user must be represented in the captured image information in order to enable the device (or software executing on or in communication with the device) to make the determination.

In at least one embodiment, software executing on the computing device attempts to locate the relative position, orientation, and movement of a user with respect to the device. Such a determination can be performed using various types of technology. For example, two-dimensional image information can be captured to determine certain direction and motion information. Devices such as the Kinect utilize structured lighting with two-dimensional image capture to obtain three-dimensional information by projecting a regular pattern of light (e.g., infrared (IR) light) and analyzing the changes in the reflected pattern due to three dimensional objects. Other approaches such as those used for motion capture use a similar approach by monitoring the change in location of specific features during user movement. In some embodiments, two-dimensional image capture can be enhanced using a distance sensor, range finders, ultrasonic transceiver, or other such device capable of providing distance information. In some embodiments, three-dimensional or stereoscopic image information can be captured to provide three-dimensional point data, or disparity information, that can be used to determine motion in three dimensions. Various other approaches can be utilized as well as should be apparent to one of ordinary skill in the art in light of the teachings and suggestions contained herein.

Figure 2:
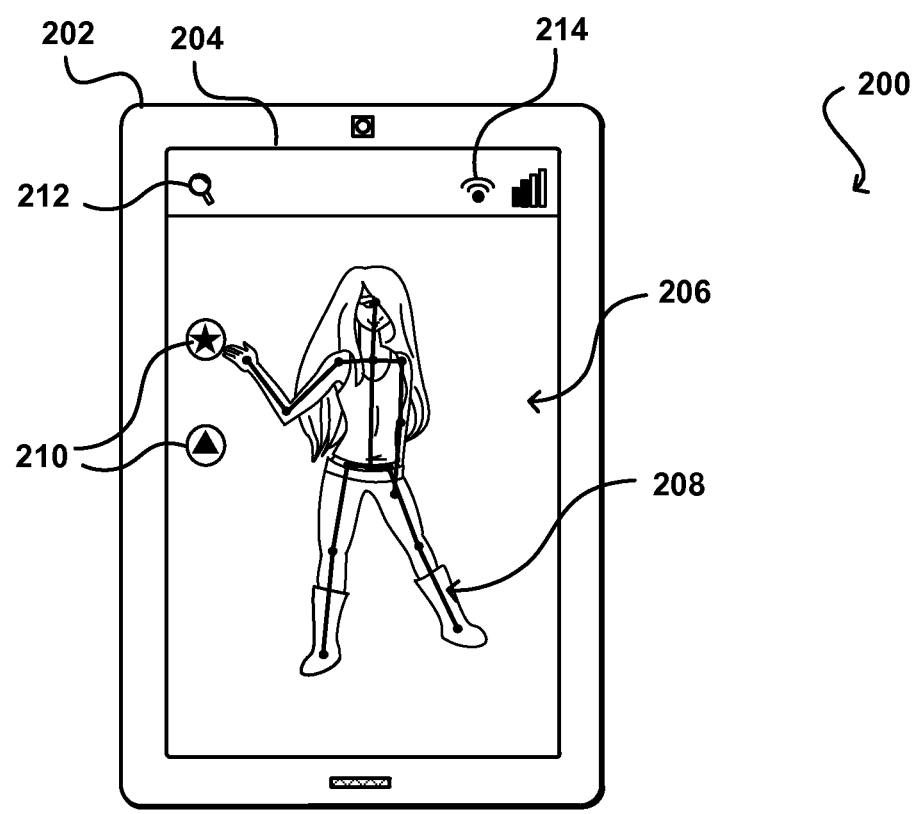
FIG. 2 illustrates an example display of user data captured and utilized by a device such as that illustrated in FIG. 1 that can be provided in accordance with various embodiments.

Image and/or other such information captured by one or more capture elements of a computing device can be used to determine various types of information. In the example state 200 of FIG. 2, for example, the captured data is analyzed to provide at least two types of information. First, at least one camera is used to capture a view of the user 206 of the device 202. The view of the user can be used for a variety of purposes, such as to perform facial recognition or user identification, as well as to determine the outline of the user's body in its current configuration relative to the computing device. Using the structured lighting reflections or other such information, three-dimensional point data can also be determined and analyzed to generate a model 208 of the body of the user that represents the current orientation of the user in three dimensions. Relying solely on two-dimensional information can make it difficult to determine when one of the user's arms is held towards the front or back of the user, for example. Further, analyzing full resolution image data can be very computationally intensive, which can provide a significant lag in motion detection. By using point data from structured lighting and determining a basic model 208 of the user's body, which can relatively accurately reflect motions of the user, gestures and motions can be determined in near real time that enable a user to provide input to the computing device. For example, in FIG. 2 a view of the user is shown, as captured by at least one camera of the imaging system, along with body position data 208, which may or may not be shown in various embodiments but is presented for purposes of explanation. In this example, the user is able to select options 210 or provide other inputs. For example, the user 206 is shown to be reaching out to "touch" the star input, which is positioned within the gesture environment. This example could correspond to an application running on a mobile device, as illustrated, where there could be other options illustrated on a display screen 204, such as the ability to perform a search using a search option 212 or turn off Wi-Fi using a selectable Wi-Fi graphical element 214.

Approaches in accordance with various embodiments also enable data from a motion, gesture, and/or imaging system, or other such system or process, to be utilized outside its native environment to be used with other applications, such as with Web pages rendered in a Web browser. For example, the data of the user model 208 generated and illustrated in FIG. 2 can be provided to a data analysis module or other such process that is capable of analyzing the shape and/or dimensions of the model in its current state to determine information such as where the user's arm is pointing, how far the user's arm is extending, where the user is looking, and/or other such information. Such a module can also be configured to determine the relative position of various elements rendered on the device display, such that the module can determine the likely element with which the user is attempting to interact or provide input. For example, in FIG. 2 the system can tell that in the current orientation the user is attempting to select one of the native environment options 210. If the user was to raise her right arm such that the visual representation was pointing towards the upper corner of the display, however, the module could determine that the user is instead attempting to select the search option 212, even though the search option is outside the native environment of the gesture system.

In order to provide such functionality, the gesture system (or other such system, service, process, or module) in various embodiments can be added to a page or interface layout through a widget, frame, window, or other portion of the rendered content. Another application or process executing on (or in communication with) the device can have access to data produced by the gesture system and can also have information about the elements, widgets, and other such content rendered on the display. The application can use gesture data provided by the gesture system, or can accept point or other such data that the application can analyze to determine various gestures. Such an approach enables applications to determine specific actions for specific gestures without having to have access to, or specific knowledge of, the gesture system. An input management application, for example, can enable the user input to act like a cursor or position-dependent touch input, for example, whereby the user can interact with various portions or elements of the display. While certain embodiments can place limits on the locations or types of functionality that can be provided through the gesture system, other embodiments can enable as much access to functionality of the device as is practical and/or possible using the gesture system.

In one example, data from a gesture system can be added to a Web page using JavaScript® or other active scripting languages capable in executing in a client browser. As mentioned, the gesture system can be connected directly to (or part of) a user computing device, or can be available over at least one network connection. In at least one embodiment, a dedicated gesture server can be configured to listen for requests (e.g., HTTP requests) from a client device or browser application, for example, as well as to listen for data from a designated gesture system. The gesture server can, upon receiving a request from a browser for gesture data, generate an unending response where units of data are encapsulated in script tags with the response stream, effectively generating a data pipe that is able to send data substantially continually from the gesture system to the web page. In at least some embodiments, such a stream can include separately executable script chunks that can be executed as soon as they are received. Other methods for establishing communications channels can be used as well within the scope of the various embodiments. In some embodiments, cross-domain communication can be enabled through use of embedded iframes or other such constructs that can enable the gesture system data (in a first domain) to be utilized on other areas of a Web page (in a second domain), as well as to allow information from the Web page domains to be provided to the gesture system, among other such functions. It at least one embodiment, the gesture data can be serialized into a notation such as JSON (JavaScript Object Notation) by the gesture server and piped into the browser through one or more JavaScript function calls, or other active script functions executing in the client browser. The gesture server can utilize at least one JavaScript API or other such interface to transfer the data. The function calls can handle the passing of the gesture data into the Web page (or otherwise out onto a network) where the gesture data is to be rendered using standard JavaScript (or other such) rendering techniques. The gesture data thus can be published not only to a local Web page but to any appropriate location available across an appropriate network, which can include other computing devices of the same or other users as discussed elsewhere herein. Similarly, data from multiple gesture systems can be included in a single Web page viewed on a single device, even though the systems might be in different locations and belong to different users, etc.

Figure 3A:
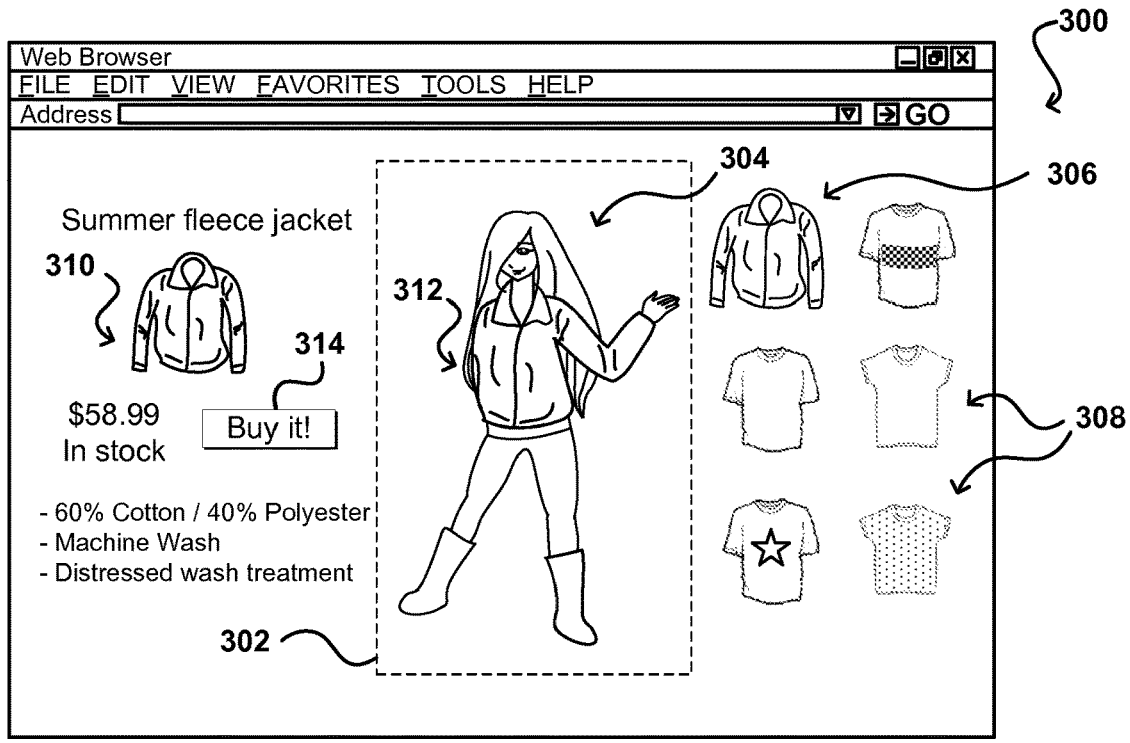
FIGS. 3(a) and 3(b) illustrate example interfaces with which a user can interact in accordance with various embodiments.

FIG. 3(a) illustrates an example state 300 of a Web page or application that can take advantage of such functionality within the scope of the various embodiments. Although a Web page showing content from an electronic marketplace is described for purposes of explanation, it should be understood that any appropriate interface rendering any appropriate type of content can take advantage of motion-, position-, or gesture-based input in accordance with the various embodiments. In this example, a page of content corresponding to clothing items offered through an electronic marketplace is displayed. The page can be a Web page rendered in HTML or another such markup language, for example, and can include one or more widgets or modules, such as a widget 302 corresponding to a gesture recognition system as discussed herein. Various other portions of the page can be provided using modules, widgets, frames, or other such sources in accordance with the various embodiments.

In the example of FIG. 3(a), the gesture widget 302 is placed on a Web page that displays a set of items 308 offered for consumption (i.e., buy, rent, purchase, lease, or download) through an electronic marketplace. Although clothing items are shown, it should be understood that various types of item can take advantage of approaches discussed herein, and that various other types of content can be selected or utilized as well in other examples. The selection of items to be displayed can be performed using any appropriate technique, such as by performing a keyword search, navigating to a particular category of items, accessing user-specific recommendations, and the like. The items 308 in the interface are images of actual products in this example, arranged in an array to the right of the interface, although various other representations and arrangements can be used as well as should be apparent in light of the present disclosure. The user can view the display while being positioned within a field of view of the gesture recognition system, such that a view of the user (or another such graphical avatar, icon, cursor, or representation) is illustrated corresponding to a current position and/or orientation of the user. When the user is facing the system, the representation shown will typically be a "mirror" image of the user, such that the user can move his or her right hand to select items on the right side of the interface, even though the image 304 or representation will appear to be using a left hand to be performing the selection.

The user in this example is able to use one or more of the user's arms to point to one or more of the items 308 displayed on the page. Contrary to the situation illustrated in FIG. 2, in this example the user is able to select items that are outside the gesture widget 302 or gesture environment. In FIG. 3(a), the user is pointing her arm towards a specific object 306. Information from the gesture system can be analyzed by an application or script executing in the client browser or on a Web server, for example, to identify the item to which the user is pointing. As discussed elsewhere herein, such a process can utilize information such as the angle of the user's arm(s), the angle of the forearm to the user's body, a distance the user is holding out the arm, and/or other such information to not only determine a direction the user is pointing, but how far along that direction the user is attempting to provide input. For example, there could be multiple items along a given direction, and the item the user intends to select can be determined by how far in that direction the user is extending his or her arm.

In FIG. 3(a) the user is determined to be pointing to a specific item 306. Upon the user selecting that item, the script executing in the client browser can request information corresponding to that item, such as by sending a request to a Web server for content corresponding to an item identifier associated with the image of the item that is displayed. In this example, information 310 for the selected item 306 can be displayed on the page to enable the user to obtain additional information about that item. There can be various types of content and information provided, although in the example display the information includes at least one image of the item, pricing and description of the item, and an option to purchase the item. Such an approach enables the user to control, adjust, or update the information displayed on a Web page using a gesture recognition system that is provided from a source (or domain) other than the provider of the Web page. In some systems the script on the page can automatically determine that the computing device contains a gesture system and can automatically enable the gesture widget 302 to be displayed on the page. In other embodiments, a user might have to associate the gesture system with the page or a user profile, among other such options. In some embodiments, the gesture system might be part of a separate computing device or system than is being used to view the page, as discussed elsewhere herein.

In at least some embodiments, the user can also utilize one of the user's hands to point towards a buy button 314 or other such option to enable the user to purchase the item without having to enter any information or perform any action other than selecting the item using the gesture system and selecting an option to purchase the selected item (assuming the user has set up a profile, provided payment information, and/or otherwise enabled such a purchasing approach).

As discussed, the gesture widget 302 does not have to show a view of the user, but might show a representation of the detected gesture or might not show anything at all, with the gesture system instead being used to control a cursor or other selection element displayed on the page. Displaying a view 304 of the user in this example, however, enables selected items to be displayed with that view of the user. As discussed, the user in this example used the gesture system to select a particular clothing item 306. Since the view of the user is displayed on the same page, software executing on the client device and/or a remote server can cause a view 312 of the selected item to be displayed on, over, or with respect to the view 304 of the user. As illustrated, such an approach can enable a user to place one or more clothing items over the view of the user, in order to provide the user with an idea of what the clothing item might look like on the user. The user can combine items to put together looks or outfits, and can see how those items go with the user's skin tone, hair color, and other such information.

In addition to color information, however, approaches discussed herein can also modify or render image information for various clothing items such that the view of the user can appear to "wear" those items, where the rendering of the items substantially corresponds to the shape of the user as represented in the view 304 in the gesture widget 302. For example, the arm of the selected jacket can be rendered to substantially match the position of the user's arm in the view, where the arm is extended to select the item. A main portion of the clothing item image can be stretched, compressed, or otherwise rendered to substantially correspond to the user's torso, in order to provide a view of what the item would actually look like if worn by the user. As discussed later herein, if the dimensions of the user are available and dimensions of the clothing item are available, such an approach also can help the user to determine the appropriate size of the item for the user, and the item can be rendered with the approximate dimensions so the user can also see how that particular size will look on the user (i.e., whether it will be too small, too long, etc.). Further, because the view of the user can be presented in near-real time using video capture, for example, the user can view different poses and perform different actions in the clothing, such as to see how the length of a pair of pants would work with bent knees as opposed to standing upright, how the back would look, etc. In some embodiments, the user can perform a gesture to capture video over a period of time for playback, such that the user can view how the outfit looked from the back or side, which might be difficult to otherwise see when the user is facing the computer and/or gesture system.

Figure 3B:
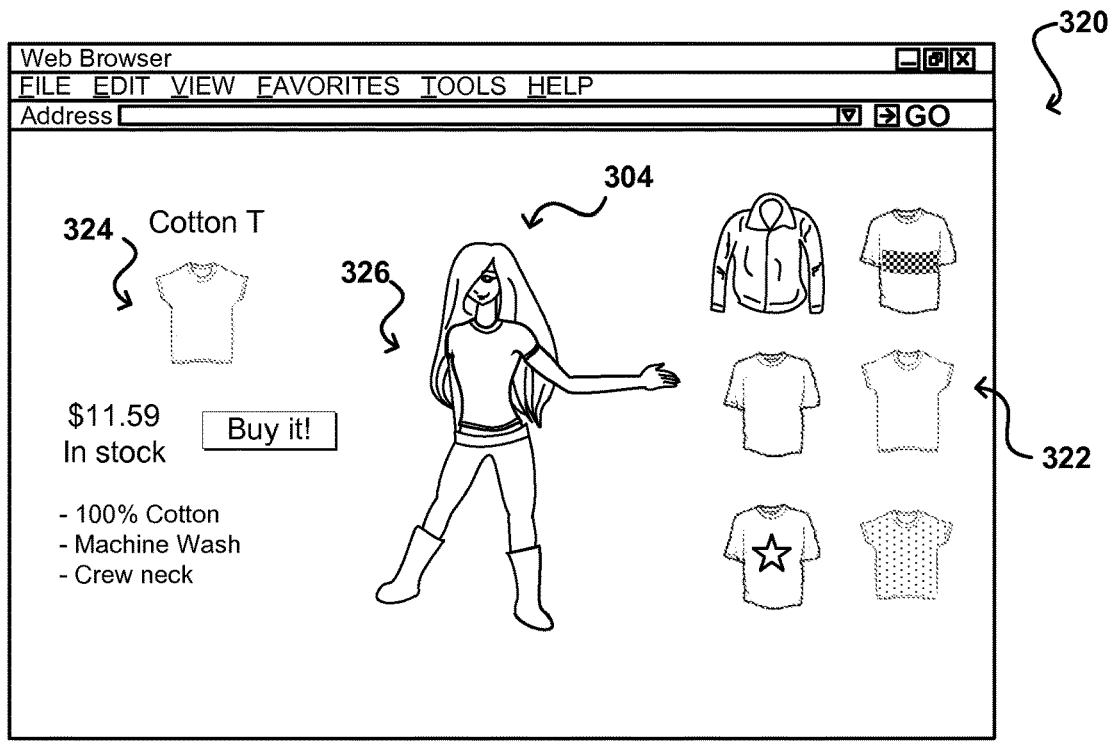

Such an approach can enable a user to virtually try on different clothing items and combinations of clothing items. For example, in the example state 320 of FIG. 3(*b*) the user has adjusted a position and/or orientation of the user's arm to select a different clothing item 322. As can be seen, the user not only changed the direction of the user's arm in order to select the appropriate item, but also extended her arm to indicate that she wanted to select the item in the far column. Upon selecting the item, which might require pointing at a specific item for at least a minimum selection period of time in at least some embodiments, the information 324 for the newly selected item can be displayed and a view 326 of the newly selected item displayed over the view 304 of the user. If the user had previously selected the pants or boots that are displayed with the view 304, for example, the user can view different tops with the pants and boots to see which combination she prefers. Further, although only shirts are shown in this example, the user can also select belts, hats, jewelry, watches, purses, tattoo designs, and other such items as well within the scope of the various embodiments.

In order to provide the selection and rendering capability, the script or application rendering the Web content (or other appropriate content) in at least some embodiments needs to be able to access and analyze the data from the gesture system. In a Web environment where the gesture data is provided as a feed of JSON data as discussed earlier, for example, script executing on the client device (or on a Web server operable to receive the feed) can analyze the skeleton data provided by the gesture system to determine relative positions of the wrist and elbow points, for example. In an example gesture system, the script might determine the relative positions of a shoulder point, elbow point, and hand point to determine a direction in which the user is pointing. In some embodiments the forearm direction as defined by the elbow and hand points can be used to determine the direction, while more complex systems might attempt to use the shoulder point as well as a head point or other such information to attempt to determine where the user is actually intending to point (as the elbow point will generally not correspond to the point of view of the user). The script also can use information such as the angle of the user's upper arm, as defined by the shoulder and elbow points, to determine the amount of extension of the user's arm, although distance of the hand from the torso or other such information can be used as well. Such information can be used to determine how far out the user is attempting to select, such as where the items are arranged in columns and the user uses extension to designate the column from which to select. In at least some embodiments the arms can behave like laser pointers that create beams that point to certain locations (but may or may not actually be shown on the display). When one of those beams intersects an item or element on the page, an appropriate action can be taken. In some embodiments, a virtual ray tracing is performed using the user's forearm, and the intersection of a ray with an item can be determined using various approaches that can be similar in at least some aspects to touch input, cursor input, and the like.

The skeleton data also can be used to determine how to render one or more image items with respect to a view of the user. As discussed, two-dimensional image data can be computationally expensive to analyze, particularly to determine three-dimensional information. In order to determine the relative positions of a user's appendages for purposes of rendering clothing or other items thereon, the skeleton can provide a faster and potentially more accurate description of those relative positions. For example, the legs of a pair of pants can be rendered to remain substantially centered around the skeletal representation of the user's legs. The points at which the arms and legs bend also can quickly be determined from the skeletal information, which can be useful when attempting to determine how to render an image of an item for a current orientation of the user.

In order to provide more accurate views, a rendering engine can also utilize the shape of the user as determined from the video feed or other such image information. For example, the skeletal information can be used to quickly determine movements and positions, but the image information can provide a more accurate view of the shape of the user's body for the purpose of rendering the clothing to appear as if the user is actually wearing the clothing. As mentioned, this can include stretching, compressing, skewing, or otherwise modifying one or more portions of an item image in order to cause that item image to be shaped according to the specific user and user pose.

As mentioned, data from a gesture system can be shared with multiple computing devices across at least one network. The ability to share data can enable users to utilize gesture data with devices that are not directly connected to the gesture system. For example, a user can stand in front of a gesture system embedded in a desktop computer or television while viewing data on a tablet computer or smart phone, where the user motions control selections on the tablet computer. A user can also perform gestures to select items to be pushed or otherwise transmitted to other devices. For example, a user selecting an item can cause information for that item to be sent to a wish list for that user that is stored on another device, or can cause information for that item to be sent to another user's device. A user also might see something that might be of interest to another user and use the interface to enable information for that item to be sent to a device of that user. Two or more users can also utilize the same gesture system concurrently in at least some systems, which can enable views of any or all of those users to utilize approaches discussed herein. Various other types of application or functionality can take advantage of body image, body position, and other such data within the scope of the various embodiments.

Figure 4:
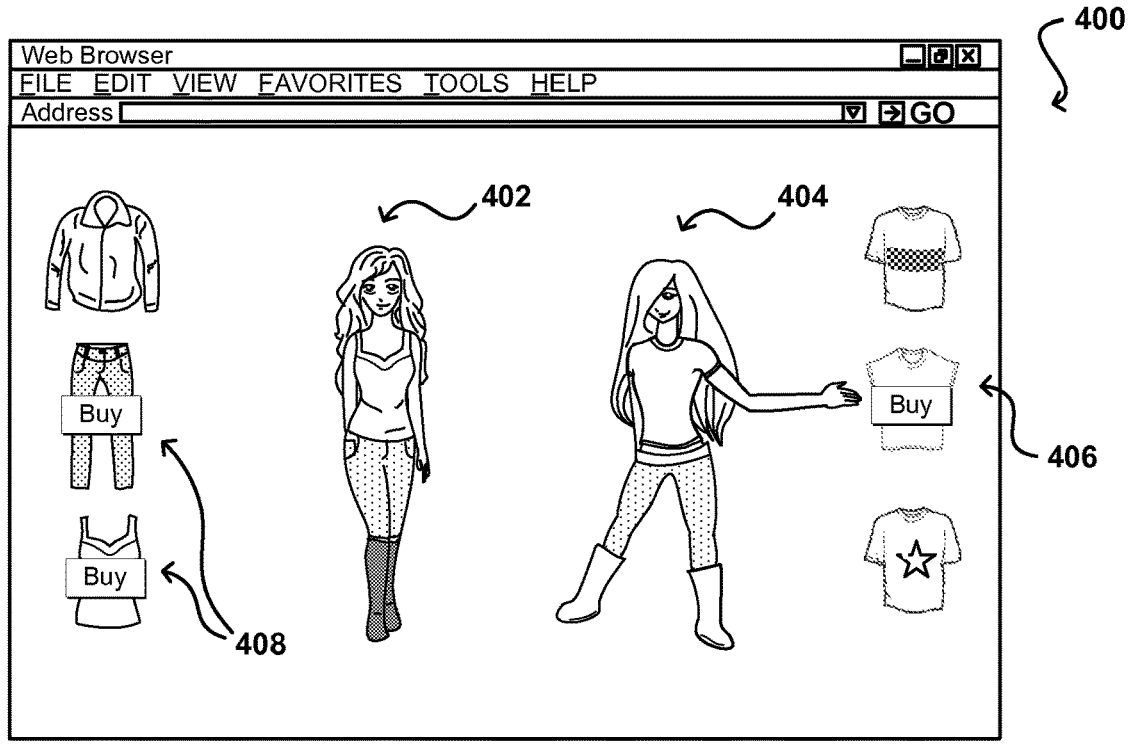
FIG. 4 illustrates an example interface with which multiple users can interact in accordance with various embodiments.

Similarly, the data from multiple gesture systems can be combined onto a single page or otherwise utilized on one or more computing devices. As an example, the interface state 400 illustrated in FIG. 4 illustrates views 402, 404 of two different users. The web page might enable both users to engage in a virtual shopping trip, where those users can be in the same location using the same gesture system or in different locations using different gesture systems. The JavaScript (or other active script) for the page can submit requests for data from the appropriate gesture system(s), and one or more widgets can be included in the page to allow that gesture data to be used to control various content displayed on the page. The same, similar, or different versions of the page can be viewed by each of the users, as well as other potential users having access to the gesture data. In this example, each user is able to perform actions or motions to cause items to be displayed on their respective views 402, 404. Two items 408 are shown to have been selected for a first user view 402, and a single item 406 for a second user view 404. In at least some embodiments, a user can select items to be rendered with respect to that user's view or another user's view. For example, a user might use one arm, hand, or finger to select an item and another arm, hand, or finger to point to the user view for which to render the item. Such an approach can enable users to have joint shopping sessions, where the users can try clothing or other items on their respective views as well as selecting items to have displayed on the other users.

As discussed, however, certain users, providers, or other such entities might not want certain types of data transmitted. For example, in FIG. 4 the users may be teenage girls, so those users, their parents, and/or a provider of the site might deem it acceptable for body image data to be transmitted and displayed to each other. If those girls are minors, however, the provider of the site, parents of those girls, or other entities might not want to be responsible for the transmission of body image data of those girls, which could potentially be viewed by, or exposed to, unauthorized users. Further, at least some of the same entities might want to ensure that body image data of other users, particularly unknown, older, and/or male users, is not able to be displayed to those girls through the site. In some cases, a user might be willing to allow position data for one of the girls to be displayed, which shows her actions or motions, but prevents the transmission of images showing the girls' bodies, or at least portions of the girls' bodies. For example, the user might deem it acceptable to transmit a view of a girl's forearm and hand, but not other parts of the body. In some embodiments, the user might only deem it acceptable to shown a cartoon or avatar version of the girl on the site.

In some embodiments, it is possible that no body part can be shown. Various other alternatives or options can be desired as well.

Accordingly, approaches in accordance with various embodiments can determine that body image data, body position data, or other such information is able to be transmitted from a computing device, and can determine whether any, all, or none of that data should actually be transmitted for any or all such purposes. For example, in the interface state 500 of FIG. 5 the script in a Web site or browser can detect or determine that the site is requesting access to body data, such as may be used to control an aspect of the site or allow an image of a user to be displayed through the site. In this example, the script can first check to see if any settings, configuration, preferences, policies, or other criteria have been established that dictate the type of data that is able to be transmitted in this situation. For example, a user or other entity might have designated that the site can have access to body image data, body position data, and/or other such information. In some embodiments, a policy might be in place that body image data can be transmitted for users over eighteen years of age, but that only body position data (e.g., skeletal data) is to be transmitted for minors, which can be used to animate an avatar or perform another such option. In some cases, a user might have previously specified a setting for this particular site, user, etc.

Figure 5:
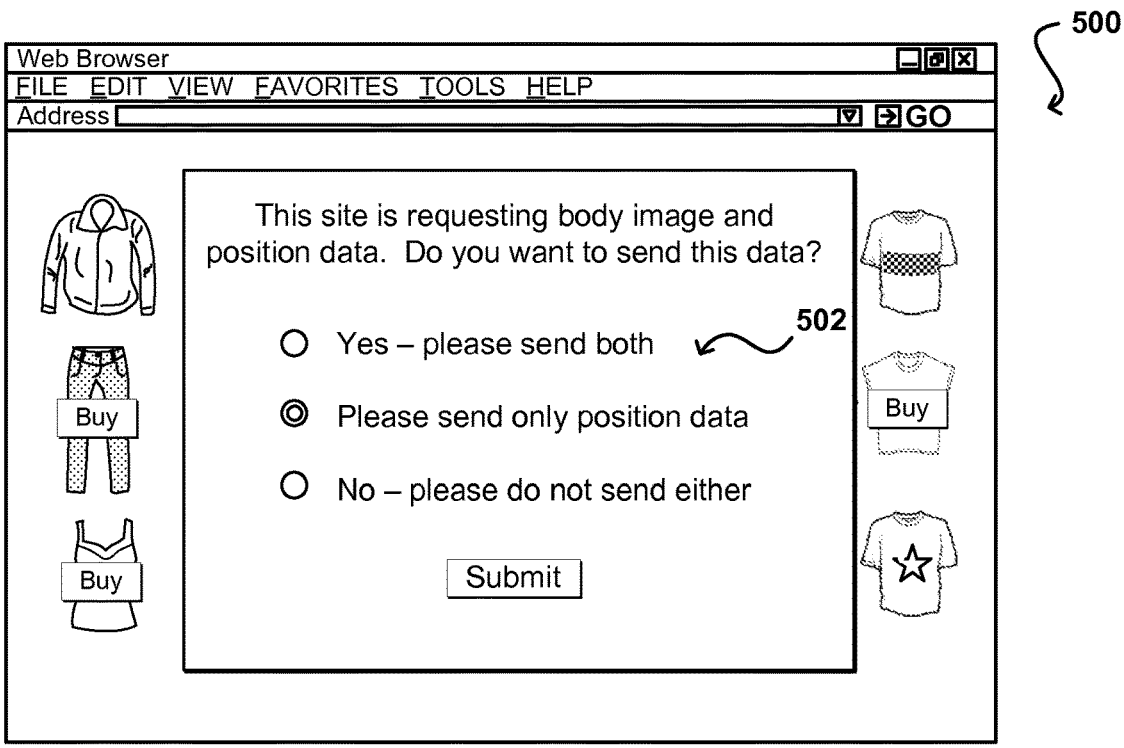
FIG. 5 illustrates a prompt that can be provided to a user before transmitting body image data in accordance with various embodiments.

In the example of FIG. 5, the browser has detected that a script is requesting body image data and body position data of the user, and has also determined that there is no setting or policy in place that dictates the type of data that should be sent for this site for this user. The script thus can cause a prompt 502 to be generated and displayed to a user that requests permission to transmit any, all, or none of the requested data. For example, the user might be willing to transmit position data for use in generating an animation of the user, but might not be comfortable sending body image data. Various other options can be provided and/or selected as well, as discussed elsewhere herein. Further, in some embodiments a prompt can take the form of a text message, instant message, or other communication sent to a parent or other entity asking for permission to transmit a certain type of data. Other prompts or permission requests can be utilized as well within the scope of the various embodiments.

Figure 6:
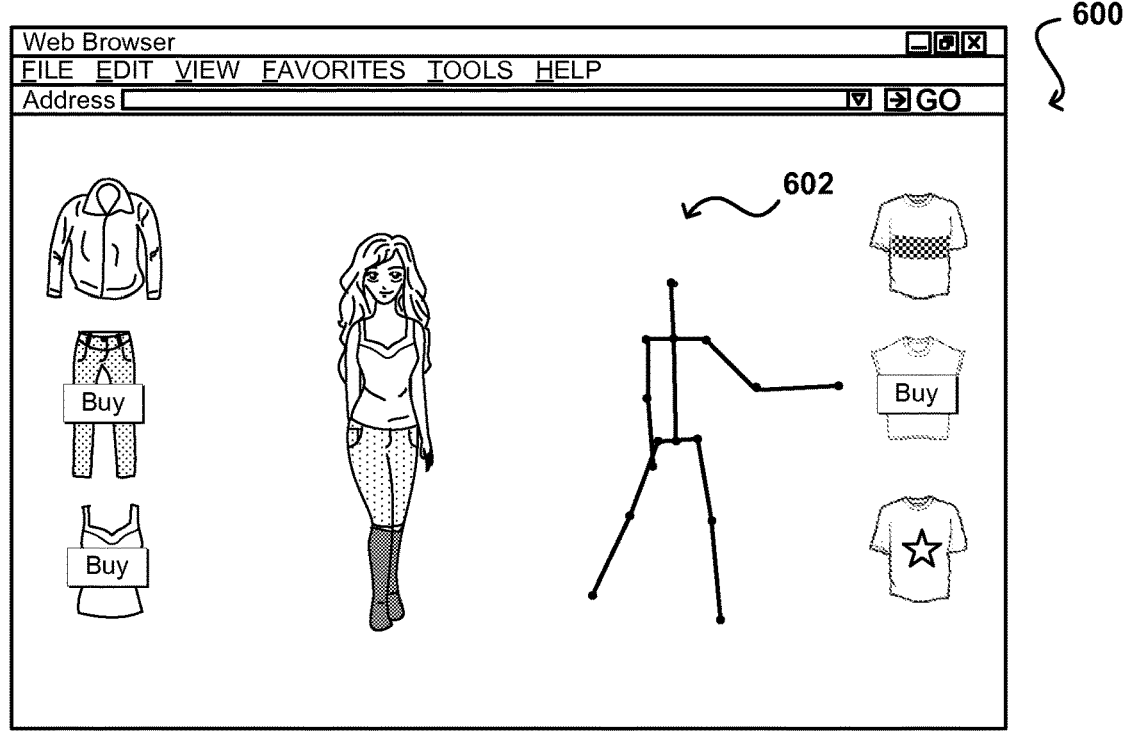
FIG. 6 illustrates an example interface wherein body configuration data has been transmitted but body image data withheld in accordance with various embodiments.

If the user has allowed body image and position data to be transmitted, the site could display the image information and utilize the body position data as shown, for example, in FIG. 4. If, on the other hand, the user has only permitted body position data to be transmitted, the view could potentially mimic that illustrated in the view 600 of FIG. 6, wherein the skeletal version 602 of the user can be displayed or utilized, which enables controls or motions to be provided without transmitting image information for the user. As should be understood, such information could be used to animate an avatar or cartoon as well in some embodiments.

Figure 7:
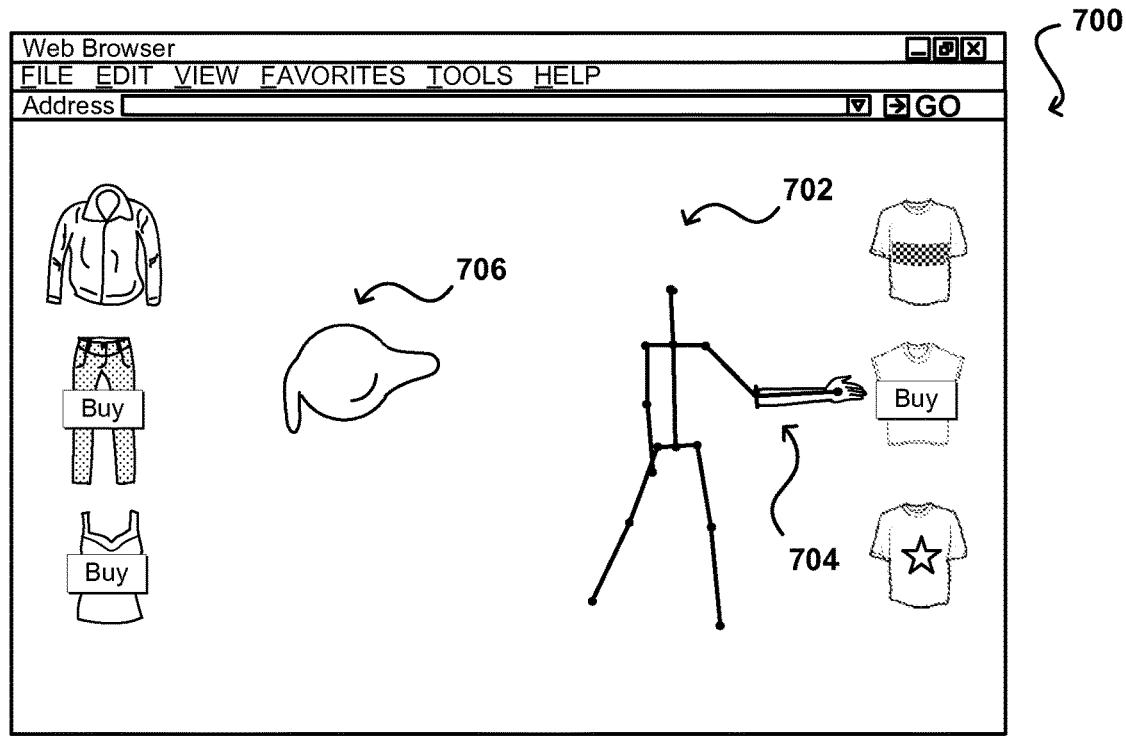
FIG. 7 illustrates an example interface wherein different views of users are provided per various permission settings in accordance with various embodiments.

In some embodiments, a site might only request access to a certain type of data. For example, for the view 700 of FIG. 7 the site might only request body image data for a part of a user, such as the user's hand or forearm 704, which can be used as a pointer for another such reason. The site might also request body position data 702 in order to animate the user, provide context for the arm or hand data, etc. If the user is determined to likely be under the age of thirteen, for example, the site might not request body position data, but might only request the position of one or both of the user's hands. In some embodiments, the skeletal data can be used to segment the body image into certain parts or portions, to be used for such transmissions. Such an approach can be used to generate and/or control a floating orb 706 or other such object that can be used to enable the user to easily select items using motions or gestures, and can show a representation of those motions or gestures, but can transmit very little actual data about the user. In some embodiments, a single point corresponding to a user's hand or fingertip might be transmitted, which can be used to control a cursor or other such object. In embodiments where the user is willing to allow body outline data to be transmitted, the skeletal data 702 can be used with the body outline data to generate a version of the user that looks like a shadow or silhouette version of the user. Various other approaches can be used as well within the scope of the various embodiments.

Figure 8:
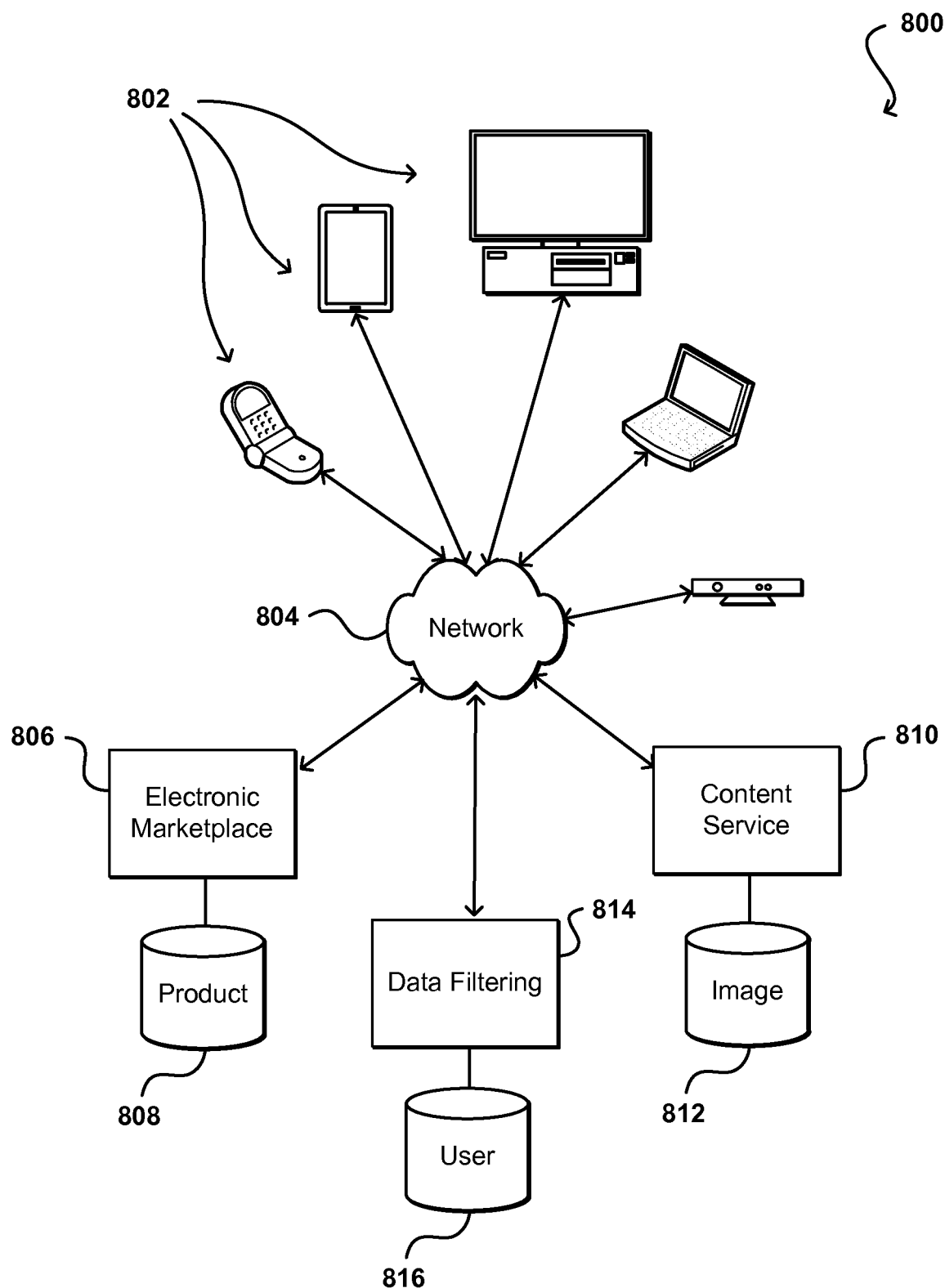
FIG. 8 illustrates an example environment in which various embodiments can be implemented.

FIG. 8 illustrates an example environment 800 in which aspects of various embodiments can be implemented. As discussed, the gesture data can be used with any of a number of different client devices 802 of any appropriate type. These devices can belong to the same or different users, and some, none, or all of these devices might include components capable of being utilized as a gesture system. Other devices might include, or require, outside or peripheral components to be utilized as a gesture system in various embodiments. In this example, the devices are connected across at least one network 804 to a content provider system, such as an electronic marketplace 806 offering products for consumption, where information for those products is stored in at least one product data store 808. A user can utilize one of the client devices 802 to view a page of content accessed from the electronic marketplace 806 over the at least one network, where gesture data captured by a gesture system of the same or a different client device can be embedded in and/or utilized with the page of content. In embodiments where images of items such as clothing are to be manipulated and rendered with a view of the user, for example, the storing, modifying, and/or other processing of the images can be performed by a content service 810 or other such entity, where the content service can be associated with the electronic marketplace 806 or a third party provider. The images to be manipulated can be accessed from the product data store 808 of the electronic marketplace and/or an image data store 812 of the content service. In many embodiments the script enabling content to be manipulated by users via gesture systems can be executed on the client devices and/or the electronic marketplace system, while in other embodiments dedicated servers or other such components, services, or providers can manage the flow of gesture data and content between the various devices and locations.

In such a system, control over the type of data that can be transmitted can be provided at a number of potential locations. For example, script or an application executing on a client device 802 might collect, store, and/or determine settings or policies for determining when to transmit certain types of data, such as body image data. In some embodiments, the settings or controls can be implemented in the physical hardware of the computing and/or gesture device. In some embodiments one or more policies might be implemented by one or more components in the network 804. For example, if a smart network switch or router can determine that body image data is being transmitted for a child, the switch might be configured to automatically strip out the body image data from the transmission. Similarly, if more than a threshold amount of skin is detected in body image data, the network component might be configured to remove that data, block the transmission, or perform another such action. In some embodiments, a network component might act as a proxy for a parent or other related party, whereby a user such as a child is constrained to access network content through the proxy, ensuring that policy restrictions on transmissions of body data are applied to that access. In other embodiments, such constraints might apply to any user utilizing a network access point, for example, as a parent or other such entity might want to enforce one or more body data policies on any user within a home, office, school, or other such location. If access to cellular carriers or other network providers is available, these policies can be enforced based on the location, whether or not the entity specifying the policies is associated with the carrier or provider. Such an approach can enable entities such as schools to control the type of content that can be transmitted to, from, or within the property boundary or region, even when the entity is not associated with multiple providers.

Similarly, the electronic marketplace 806 might store a policy that indicates that body image data is not to be requested from users under a certain age, in a certain geographic region, having a specified characteristic, etc. The electronic marketplace might also place such a policy on an edge server or other such component, whereby if such data is received the data can be removed or request denied such that no internal components of the system or service ever receive the data. A content service 810 for animating or providing content for the user image can perform similar functions.

In some embodiments, any of the above-mentioned or other such entities can subscribe to a data filtering service 814, or other such component or entity, that is operable to receive and analyze transmissions to ensure that those transmissions comply with data transmission specifications. For example, a page of the electronic marketplace might include script that causes data from a client device to be sent to the data filtering service 814, which then can forward the data to the marketplace system 806. In such an embodiment, the data filtering system upon receiving a transmission can lookup information in a user data store 816 or other such location to determine the type of data that is allowed for this transmission. If the transmission includes body image data but a policy dictates that such data is not allowed in this type of transmission, the data filtering service can remove that data from the transmission before forwarding that transmission to the intended recipient. The policies or filtering criteria stored by the filtering service can come from any appropriate entity, such as a user, developer, manufacturer, provider, etc.

Figure 9:
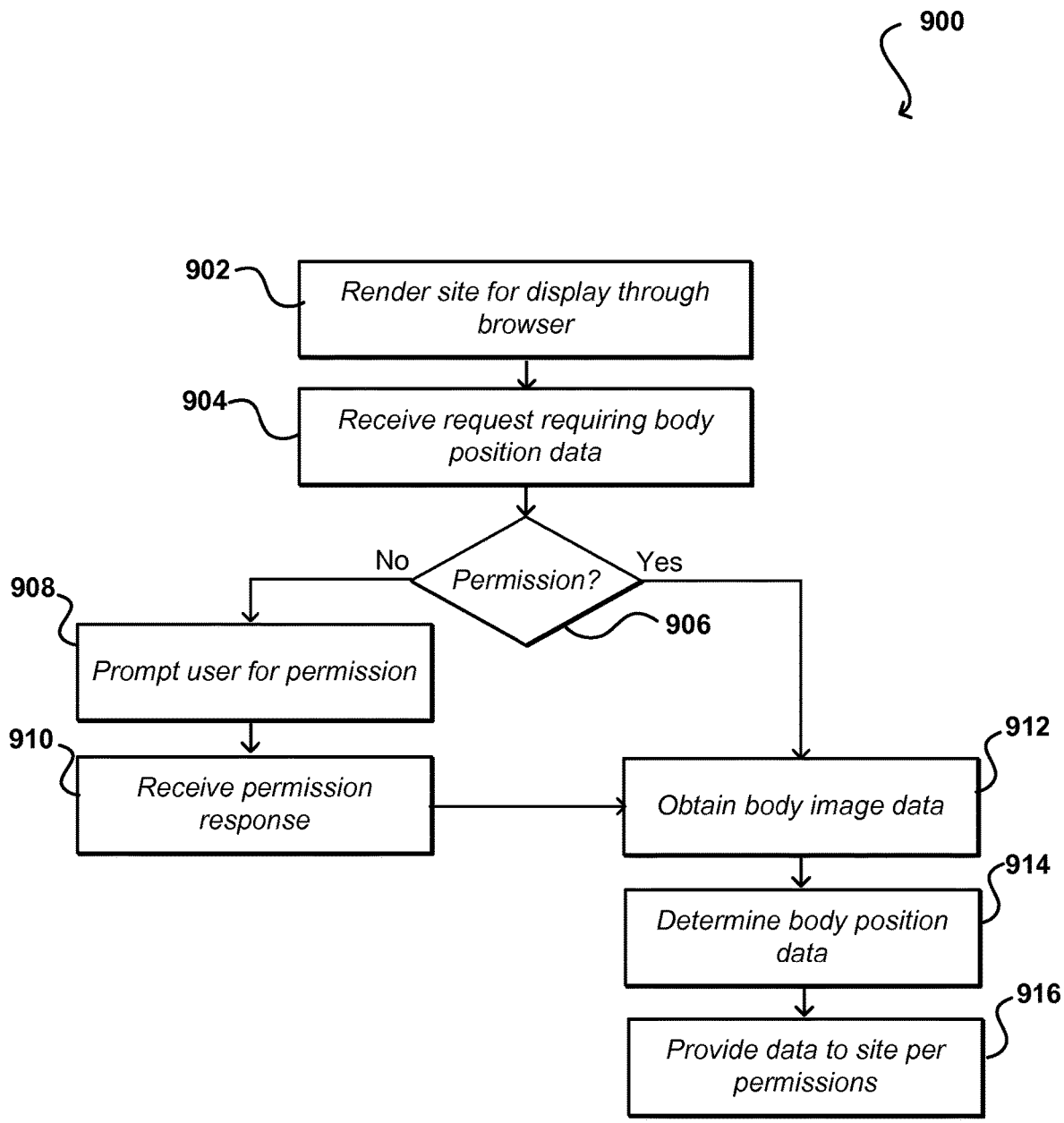
FIG. 9 illustrates an example process for controlling the sending of body data from a client browser that can be utilized in accordance with various embodiments.

FIG. 9 illustrates an example process 900 for managing the types of data transmitted via a browser application executing on a client device that can be utilized in accordance with various embodiments. It should be understood that, for any process discussed herein, there can be additional, fewer, or alternative steps performed in similar or alternative orders, or in parallel, within the scope of the various embodiments unless otherwise stated. In this example, a site is rendered 902 for display through the browser application. Approaches for receiving code and rendering a site using that code are well known in the art and will not be discussed in detail herein. A request for body position, image, or other such data can be received 904, whether from the script for site, a provider of the site, a user of the client device, another user of the site, or another such entity. A determination can be made 906 as to whether permission settings exist that apply to the request. If not, the script of the browser (or other such executing code) can cause a prompt to be generated 908 that requests permission information from the user. As discussed, this can include permission to transmit any, all, or none of the requested data. A response can subsequently be received 910 that includes the permission settings to be used for this transmission, site, user, etc. Once permission settings have been obtained, or while permission settings are being obtained, the client device can begin obtaining 912 body image data and determining 914 body position as discussed elsewhere herein. The data then can be provided 916 to the site per the determined permissions settings, such as to transmit all, a portion, or none of the requested data.

Figure 10:
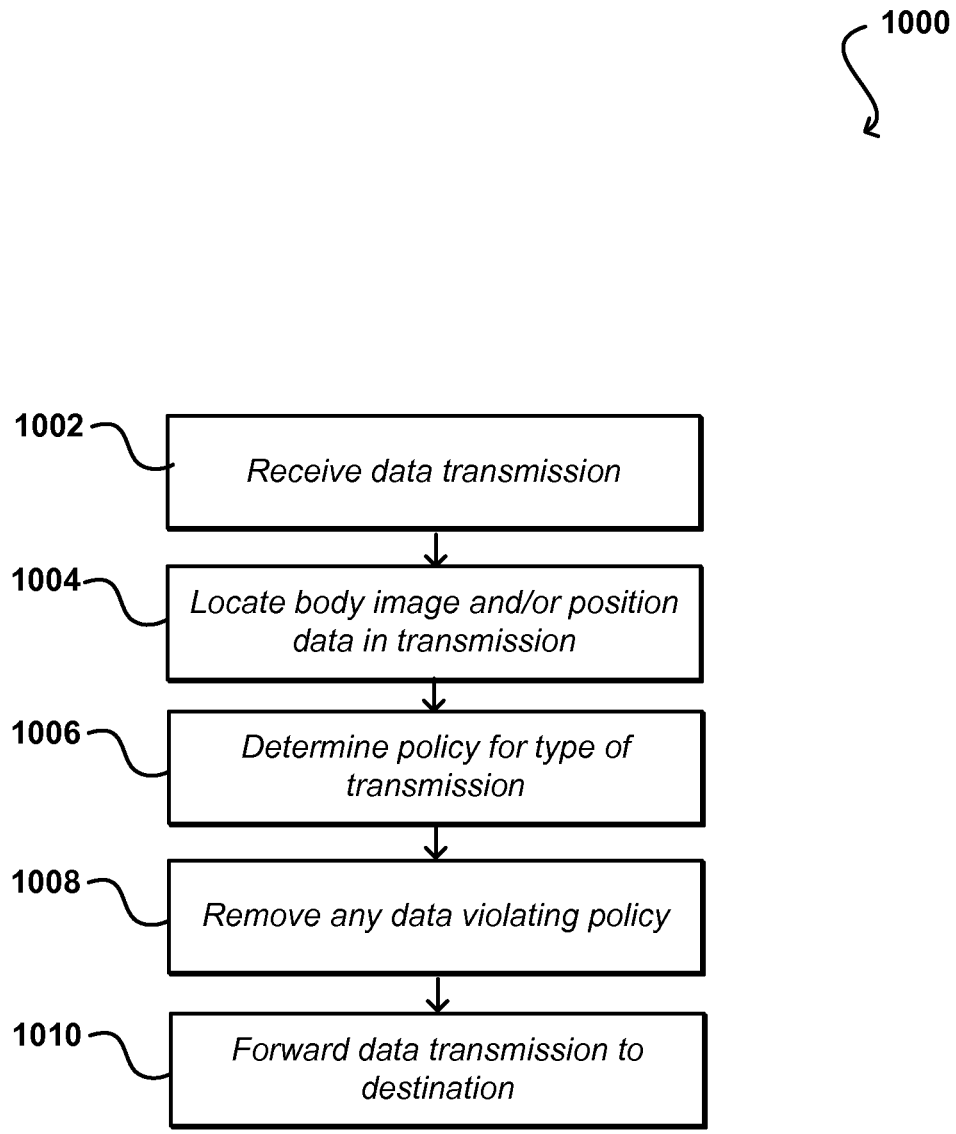
FIG. 10 illustrates an example process for enforcing policies on the transmission of body data that can be used in accordance with various embodiments.

FIG. 10 illustrates a similar process 1000 that can enable a logically centralized system, service, or component to enforce or apply filtering policies in accordance with various embodiments. As mentioned above, a component such as a filtering service can receive 1002 a data transmission. The transmission can be analyzed to locate 1004 the presence of any body image data or body position data in the transmission. If any such data is located, at least one appropriate policy can be determined 1006 that applies to this type of transmission. This can include, for example, disallowing any or all of the body data. In response, any data violating an applicable policy can be removed 1008, or other transmission can be denied, among other such options. Once any violating data has been removed, the transmission can be forwarded 1010 to the intended destination or recipient.

In some embodiments, the type of data transmitted can depend at least in part upon the intended use. For example, if a Web site sells watches that site might only want image data for a user's forearm so the user can virtually try on the watch, without having to transmit or receive data showing the user's torso. Some sites might not want to receive a view of a user's face, which can be used to identify the user. The face data can thus be removed, blurred, replaced with an object or animation, etc. Other sites might accept face data but not want any image information of the user's body, such as a site that sells makeup or sunglasses. At least some of these might also enable a user to transmit body data, however, such as where the user wants to virtually try on items. In some embodiments, the user can try on items in that user's browser, but only the allowed portions can be transmitted to be viewed by another user or on another device.

In some embodiments, a user might install a plug-in into a browser or other such application that can enforce specified transmission policies, and ensure that data is not unknowingly transmitted. For example, once browsers and sites are able to capture and send image data from a gesture device, users might worry that sites can cause image data to be captured and transmitted at any time, unbeknownst to the user. Accordingly, a user might install and/or configure a plug-in that does not allow transmissions of image or body data except where explicitly allowed by the user, or as otherwise indicated. In some embodiments a plug-in can at least generate a notification, provide an icon, play a sound, or activate a light on the computing device in order to inform the user that body data is currently being captured and transmitted, such that the user can take an appropriate action.

A recipient of body data, such as a device, application, or site, also might specify that certain types of information are not to be received for purposes unrelated to privacy concerns. For example, if a site uses body position data only to move a virtual cursor, the site might not want to receive body image data because the body image data can be significant in size and the site might not want to use the bandwidth, processing capacity, or other resources necessary to handle that volume of unnecessary data.

In some embodiments, code for a site or application might include event handlers that cause certain body data to be requested when a certain motion of the user is detected. The event handler could then kick off an approval process for the user, if information has not already been provided, about whether to provide the requested data. The user could then potentially provide more granular approvals, such as on a per-arm or per-leg basis.

In at least some embodiments, a site or application can provide a display of the information that is being transmitted to other users, such that the user can make adjustments if desired. For example, a user might have made a setting adjustment for one site and forget about the adjustment. When the user subsequently transmits data, the user can see the effects of the current setting and be reminded to update the setting for the current context.

Transmission settings that are based upon factors such as age or gender can obtain that information in a number of different ways. For example, information can be obtained from a profile for that user if accessible. In other embodiments, an image recognition process can analyze the captured, transmitted, and/or received image data to attempt to determine age, gender, amount or portions of exposed skin, or other such information for use in applying an appropriate policy.

As discussed, for certain sites or applications the type of information requested might depend on a category or type of content of the page, intended use of the data, or other such information. For example, a puzzle game might only want the locations of the user's hands, a watch seller might want image data for the user's hands, and a gesture-controlled video game might want at least skeletal and silhouette data, if not full body image data. Users also can specify settings for each such category or situation.

Some embodiments might also utilize various levels of permission. For example, if a site wants only skeletal data then that information might be provided automatically, unless otherwise indicated by a user. If a site wants arm or hand data, a user might be prompted to allow transmission of this data. If a transmission would include image information of the body or face of a child, the transmission might require the permission of a parent, if the transmission is allowable at all. Various other levels can be utilized as well for different purposes. In some embodiments, a script requesting a first level of access that is not available to the script can have the ability to request a lower level of access, instead of being denied access to the data.

In some embodiments, a user might be able to make a gesture to permit the transmission of certain information. For example, a user browsing a watch site might use an arm for cursor control, and thus not want to transmit image data. If the user wants to use the right arm to continue to control the cursor but wants to virtually try a watch on the user's left arm, the user might perform a two-finger tap or other gesture on the user's left arm using the user's right arm, which can indicate to the site, browser, and/or device that image data for the left arm is now permitted to be transmitted. Various other motions can be used as well. Voice commands or other inputs can be used to provide such permission as well.

In some embodiments, a user might capture an image of one or more portions of a user that are able to be transmitted. For example, a user might be in a nice outfit and happy with his or her appearance, and might capture an image to be stored for use with a gesture device. When body data is subsequently to be sent, the current body position data can be captured and transmitted, but the body image data can correspond to the previously-captured and stored image, which can be mapped to the skeletal view from the body position data. This enables a view of the user to be provided without having to transmit a current view of the user, in case the user is in his or her pajamas, is not wearing makeup, is having a bad hair day, etc. Such an approach can also ensure that an appropriate view of the user is being transmitted, as may be controlled by a parent or other such entity.

In some embodiments a user can hold a pointer, stick, toy, or other such object that can act as a focus of the image data. The image and position data transmitted then can be limited to the object in focus. Such an approach enables a child to interact with a Web site using a toy without also transmitting image data including a view of the child.

For social networking applications, the type of data transmitted and/or displayed can depend upon the relationship to the user. For example, a friend or connection of the user might be able to receive or view body image data. A friend of a friend, or secondary connection, might only be able to see body position data or an avatar view of the user. A person outside the social circle might not be able to receive any such data. Various other such options can be utilized as well.

Since gesture data can include image information including a view of the user, a system can attempt to determine aspects of the user that can assist with various aspects of, for example, a user selection process. If a facial recognition process can identify the user, search results can be displayed that are based upon preferences or stored information for that user. If an image analysis process can identify a gender or approximate age or size of a user, that information can be used to narrow search results or other information selected to be displayed to the user. If views of a male user and a female user are shown on a page, and an item for a female is selected, the system can assume that the item should be rendered for the female in at least some situations. Various other aspects can be determined and used to adjust a selection of content as well within the scope of the various embodiments.

In some embodiments, a computing device might utilize one or more motion-determining elements, such as an electronic gyroscope, to attempt to assist with motion and gesture determinations. By determining movements of the device during image capture, effects of the device movement can be removed to provide more accurate three-dimensional position information for the tracked user features. Further, determining that an apparent motion in the image information was due to a device movement instead of a user gesture can help to prevent false input determinations.

Figure 11:
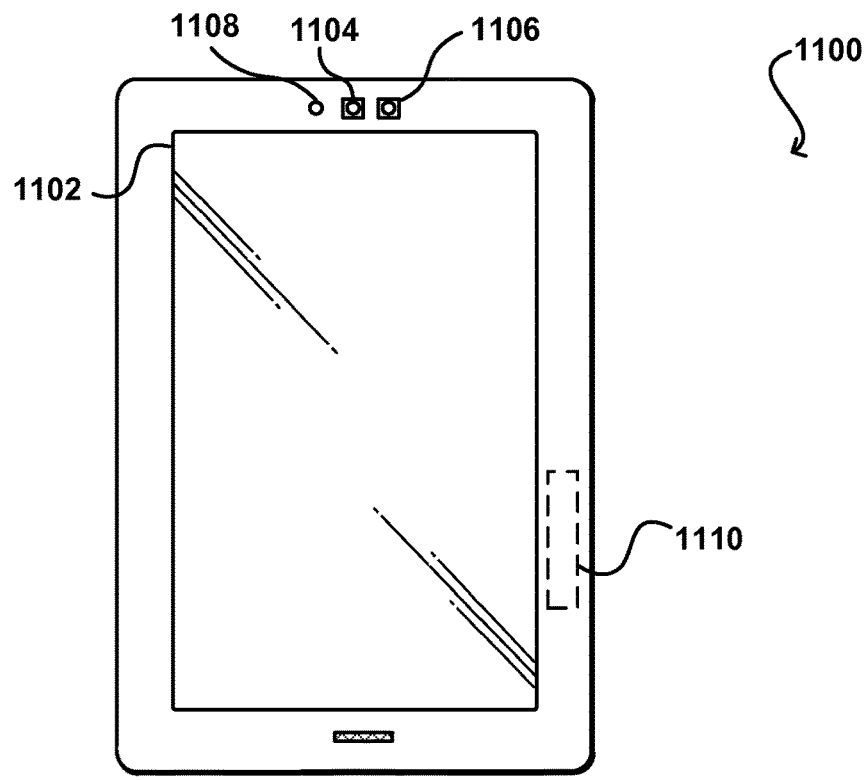
FIG. 11 illustrates an example computing device that can be used in accordance with various embodiments.

FIG. 11 illustrates an example computing device 1100 that can be used to perform methods in accordance with various embodiments discussed and suggested herein. In this example, the device has at least one camera or sensor 1104, 1106 positioned at various locations on the same side of the device as a display element 1102, enabling the device to capture image and/or position information about a user of the device during typical operation where the user is at least partially in front of the display element. In this example, the camera and/or sensor are each capable of capturing image information over a visible and/or infrared (IR) spectrum, and in at least some embodiments can select between visible and IR operational modes. It should be understood, however, that there can be fewer or additional elements of similar or alternative types in other embodiments, and that there can be combinations of cameras, infrared detectors, gesture sensors, and other such elements used with various devices.

In this example, a light sensor 1108 is included that can be used to determine an amount of light in a general direction of objects to be captured. In some embodiments, at least one illumination element, such as a white light emitting diode (LED) or infrared (IR) emitter, as discussed elsewhere herein, can be utilized for providing illumination in a particular range of directions when, for example, there is insufficient ambient light determined by the light sensor or reflected IR radiation is to be captured, such as where a pattern of structured light is to be produced as part of a gesture system. A motion determining element 1110 can also be utilized to attempt to distinguish user movement from device movement. Various other elements and combinations of elements can be used as well within the scope of the various embodiments as should be apparent in light of the teachings and suggestions contained herein.

Figure 12:
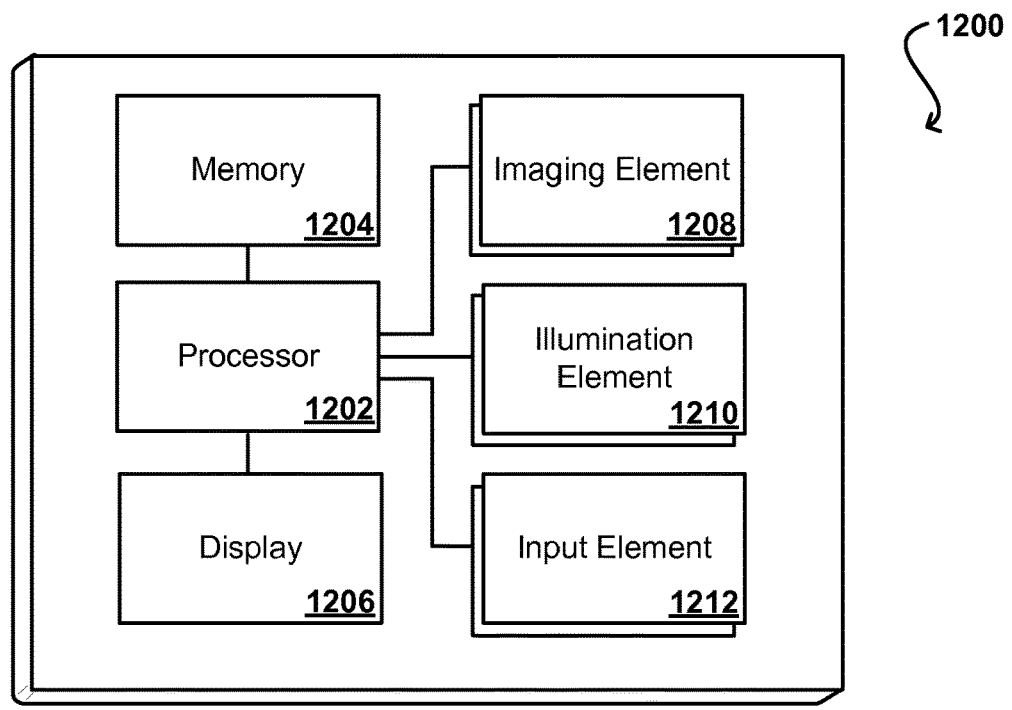
FIG. 12 illustrates an example configuration of components of a computing device such as that illustrated in FIG. 11.

In order to provide various functionality described herein, FIG. 12 illustrates an example set of basic components of a computing device 1200, such as the device 1100 described with respect to FIG. 11. In this example, the device includes at least one central processor 1202 for executing instructions that can be stored in at least one memory device or element 1204. As would be apparent to one of ordinary skill in the art, the device can include many types of memory, data storage or non-transitory computer-readable storage media, such as a first data storage for program instructions for execution by the processor 1202, the same or separate storage can be used for images or data, a removable storage memory can be available for sharing information with other devices, etc. The device typically will include some type of display element 1206, such as a touch screen, electronic ink (e-ink), organic light emitting diode (OLED) or liquid crystal display (LCD), although devices such as portable media players might convey information via other means, such as through audio speakers. In at least some embodiments, the display screen provides for touch or swipe-based input using, for example, capacitive or resistive touch technology.

As discussed, the device in many embodiments will include at least one image capture element 1208, such as one or more cameras or sensors that are able to image a user, people, or objects in the vicinity of the device. An image capture element can include, or be based at least in part upon any appropriate technology, such as a CCD or CMOS image capture element having a determined resolution, focal range, viewable area, and capture rate. The image capture elements can also include at least one IR sensor or detector operable to capture image information for use in determining gestures or motions of the user. In some embodiments, the cameras and/or sensors used for motion and gesture recognition might be provided through a separate peripheral device, such as a sensor bar. The example device includes at least one illumination component 1210, such as an IR source with a patterned lens for producing structured light. The device also can include at least one other illumination element, as may include one or more light sources (e.g., white light LEDs, IR emitters, or flashlamps) for providing illumination for a standard digital video camera.

The example device can include at least one additional input element 1212 configured to receive conventional input from a user. This conventional input can include, for example, a push button, touch pad, touch screen, wheel, joystick, keypad, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual (e.g., gesture) and audio (e.g., spoken) commands such that a user can control the device without having to be in contact with the device.

As discussed, different approaches can be implemented in various environments in accordance with the described embodiments. As will be appreciated, although a Web-based environment is used in various examples for purposes of explanation, different environments may be used, as appropriate, to implement various embodiments. An example electronic client device can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. The network can include the Internet, a cellular network, a local area network (LAN) and the like. Various network-specific components can be used, although not shown, as would be apparent to one of ordinary skill in the art.

It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. An application server can include any appropriate hardware and software for integrating with the data store as needed to execute aspects of one or more applications for the client device and handling a majority of the data access and business logic for an application. The application server can provide access control services in cooperation with the data store and is able to generate content such as text, graphics, audio and/or video to be transferred to the user, which may be served to the user by a Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store can include mechanisms for storing content (e.g., production data) and user information, which can be used to serve content for the production side. The data store can also include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are described. Thus, the depiction of the system should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, JavaScript, C, C # or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keypad, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and non-transitory computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   under control of one or more computing systems configured with executable instructions;
   receiving, by a device processor, a request to transmit human body data, the human body data including at least one of body image data or body position data;
   determining, from a user data store, permission data associated with the request, the permission data corresponding to aspects of the body image data or the body position data allowed for transmission;
   comparing the permission data to the human body data;
   filtering, by the device processor, the human body data to identify the aspects allowed for transmission based at least in part upon the comparing the permission data to the human body data;
   transmitting, based at least in part on the filtering, at least a portion of the body position data associated with the aspects allowed for transmission in response to the request;
   generating an animation of a human body based at least in part on the transmitted portion of the body position data when causing the transmission of the body image data is not allowed based on the permission data; and
   modifying the animation to depict a representation of at least one item selected by a user.

2. The computer-implemented method of claim 1, further comprising:
   deleting any portion of the human body data that violates the permission data, before causing the transmission.

3. The computer-implemented method of claim 1, wherein determining permission data further comprises:
   causing a user interface element to be generated, the user interface element operable to cause an indication whether permission is granted to transmit the body image data or the body position data; and
   receiving the indication that permission is granted.

4. The computer-implemented method of claim 1, further comprising:
   determining an intended use for the human body data;
   determining a subset of the human body data corresponding to the intended use; and
   determining, based on the permission data, that the subset of the human body data is allowed for transmission.

5. The computer-implemented method of claim 1, wherein the request is associated with a source, and further comprising:
   causing a user interface element to be generated, the user interface element including information describing the permission data associated with the request;
   receiving input comprising an adjustment to at least a portion of the permission data to generate adjusted permission data; and
   associating the adjusted permission data with the source.

6. The computer-implemented method of claim 1, further comprising:
   determining that the request is for human body data that is not allowed based on the permission data;

determining a subset of the human body data that is allowed based on the permission data; and causing the subset of the human body data to be transmitted in response to the request.

7. A computing device, comprising:

a device processor; and a memory device including instructions operable to be executed by the device processor to perform a set of actions, enabling the computing device to:

receive, by the device processor, a request to transmit human body data, the human body data including at least one of body image data or body position data obtained from a gesture system;

determine, from a user data store, permission data associated with the request, the permission data corresponding to aspects of the body image data or the body position data allowed for transmission;

compare the permission data to the human body data;

filter, by the device processor, the human body data to identify the aspects allowed for transmission based at least in part upon the comparing the permission data to the human body data;

send the human body data associated with the identified aspects as allowed for the transmission based at least in part on the filtering;

generate an animation of a human body based at least in part on the sent human body data when causing the transmission of the body image data is not allowed based on the permission data; and modify the animation to depict a representation of at least one item selected by a user.

8. The computing device of claim 7, wherein the gesture system is contained at least partially within the computing device or external to the computing device.

9. The computing device of claim 7, wherein the gesture system includes at least one video camera capable of providing the body image data and at least one structured light subsystem operable to provide the body position data.

10. The computing device of claim 7, wherein the instructions when executed further cause the computing device to:

prompt the user for permission data when permission data does not exist that applies to the request.

11. The computing device of claim 7, wherein the instructions when executed further cause the computing device to:

determine, based on information communicated from the gesture system, that a first subset of the human body data corresponds to a gesture;

determine that the gesture is directed to a second subset of the human body data; and transmit the second subset of the human body data.

12. The computing device of claim 7, wherein the instructions when executed further cause the computing device to:

determine, based on the body image data, a first characteristic of a second user; and customize, based on the first characteristic, information selected to be displayed to the second user without sending the body image data.

13. The computing device of claim 7, wherein the instructions when executed further cause the computing device to:

determine, based on information communicated from the gesture system, a motion made by the user;

determine a portion of the human body data corresponding to the motion;

determine that the portion of the human body data is not included in the request; and modify the request to include the portion of the human body data.

14. The computing device of claim 7, wherein the instructions when executed further cause the computing device to:

cause a user interface element to be generated, the user interface element operable to cause an indication whether permission is granted to transmit the body image data or the body position data;

receive the indication that permission is granted; and cause, based at least in part on the indication, at least a portion of the body image data or the body position data to be transmitted in response to the request.

15. The computing device of claim 7, wherein the instructions when executed further cause the computing device to:

determine an intended use for the human body data;

determine a subset of the human body data corresponding to the intended use; and determine, based on the permission data, that the subset of the human body data is allowed for transmission.

16. The computing device of claim 7, wherein the instructions when executed further cause the computing device to:

cause a user interface element to be generated, the user interface element including information describing the permission data associated with the request;

receive input comprising an adjustment to at least a portion of the permission data to generate adjusted permission data; and associate the adjusted permission data with a request source.

17. The computing device of claim 7, wherein the instructions when executed further cause the computing device to:

determine that the request is for human body data that is not allowed based on the permission data;

determine a subset of the human body data that is allowed based on the permission data; and cause the subset of the human body data to be transmitted in response to the request.

18. A non-transitory computer-readable storage medium storing instructions that, when executed by at least one processor of a computing device, cause the computing device to:

receive, by a device processor, a request to transmit human body data, the human body data including at least one of body image data or body position data;

determine, from a user data store, permission data associated with the request, the permission data corresponding to aspects of the body image data or the body position data allowed for transmission;

compare the permission data to the human body data;

filter, by the device processor, the human body data to identify the aspects allowed for transmission based at least in part upon the comparing the permission data to the human body data;

transmit, based at least in part on the filtering, at least a portion of the body position data associated with the aspects allowed for transmission in response to the request;

delete any portion of the human body data that violates the permission data, before causing the transmission;

generate an animation of a human body based at least in part on the transmitted portion of the body position data when causing the transmission of the body image data is not allowed based on the permission data; and modify the animation to depict a representation of at least one item selected by a user.

* * * * *